United States Patent
Diver, Jr. et al.

(10) Patent No.: US 9,279,188 B2
(45) Date of Patent: Mar. 8, 2016

(54) HYBRID METAL OXIDE CYCLE WATER SPLITTING

(75) Inventors: Richard B. Diver, Jr., Albuquerque, NM (US); Robert D. Palumbo, Valparaiso, IN (US); Nathan P. Siegel, Lewisburg, PA (US); James E. Miller, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 99 days.

(21) Appl. No.: 14/115,095

(22) PCT Filed: Jul. 29, 2011

(86) PCT No.: PCT/US2011/001340
§ 371 (c)(1),
(2), (4) Date: Oct. 31, 2013

(87) PCT Pub. No.: WO2013/019167
PCT Pub. Date: Feb. 7, 2013

(65) Prior Publication Data
US 2014/0102912 A1    Apr. 17, 2014

Related U.S. Application Data

(60) Provisional application No. 61/368,756, filed on Jul. 29, 2010.

(51) Int. Cl.
*C25B 1/04* (2006.01)
*C01B 3/06* (2006.01)
(52) U.S. Cl.
CPC . *C25B 1/04* (2013.01); *C01B 3/063* (2013.01); *Y02E 60/36* (2013.01)

(58) Field of Classification Search
CPC .......................................................... C25B 1/04
USPC .......................................................... 205/637
See application file for complete search history.

(56) References Cited

U.S. PATENT DOCUMENTS

| | | | |
|---|---|---|---|
| 3,807,090 A | 4/1974 | Moss | |
| 4,192,726 A | 3/1980 | Pangborn et al. | |
| 4,202,744 A * | 5/1980 | Pan et al. | 205/339 |
| 4,256,549 A * | 3/1981 | Divisek et al. | 205/354 |

(Continued)

FOREIGN PATENT DOCUMENTS

WO    WO 2013/019167 A1    3/2013

OTHER PUBLICATIONS

PCT/US2011/001340 International Search Report mailed Dec. 14, 2011, 2 pages.

*Primary Examiner* — Nicholas A Smith
(74) *Attorney, Agent, or Firm* — Daniel J. Jenkins

(57) ABSTRACT

Hybrid thermochemical water splitting cycles are provided in which thermally reduced metal oxides particles are used to displace some but not all of the electrical requirements in a water splitting electrolytic cell. In these hybrid cycles, the thermal reduction temperature is significantly reduced compared to two-step metal-oxide thermochemical cycles in which only thermal energy is required to produce hydrogen from water. Also, unlike the conventional higher temperature cycles where the reduction step must be carried out under reduced oxygen pressure, the reduction step in the proposed hybrid cycles can be carried out in air, allowing for thermal input by a solar power tower with a windowless, cavity receiver.

6 Claims, 2 Drawing Sheets

(56) References Cited

U.S. PATENT DOCUMENTS

| | | | |
|---|---|---|---|
| 4,608,137 A | * | 8/1986 | Vaughan et al. .............. 205/637 |
| 5,492,777 A | * | 2/1996 | Isenberg ................. C01B 3/061 429/221 |
| 2006/0188433 A1 | | 8/2006 | Weimer et al. |
| 2007/0045125 A1 | | 3/2007 | Hartvigsen et al. |
| 2008/0019903 A1 | | 1/2008 | Wegner |
| 2009/0120802 A1 | | 5/2009 | Ciampi et al. |
| 2012/0175268 A1 | * | 7/2012 | Joshi et al. .................... 205/412 |

* cited by examiner

HYBRID METAL OXIDE CYCLE WATER SPLITTING

CROSS REFERENCE TO RELATED APPLICATION

This application claims priority to U.S. provisional application Ser. No. 61/368,756, filed on Jul. 29, 2010, which is hereby incorporated by reference in its entirety.

BACKGROUND OF THE DISCLOSURE

The present disclosure relates generally to methods and apparatus associated with hybrid metal oxide cycle water splitting.

SUMMARY OF THE INVENTION

In one aspect of the disclosure, a hea hybrid thermochemical water splitting cycle includes thermally reducing a metal oxide with concentrated solar energy and reoxidizing an oxygen-deficient metal oxide in an electrochemical cell, wherein the chemical potential for the reactions is provided by the metal oxide and electrical energy, and wherein the electrical energy required is significantly lower than needed for water or carbon dioxide electrolysis alone.

DETAILED DESCRIPTION

Figure 1:
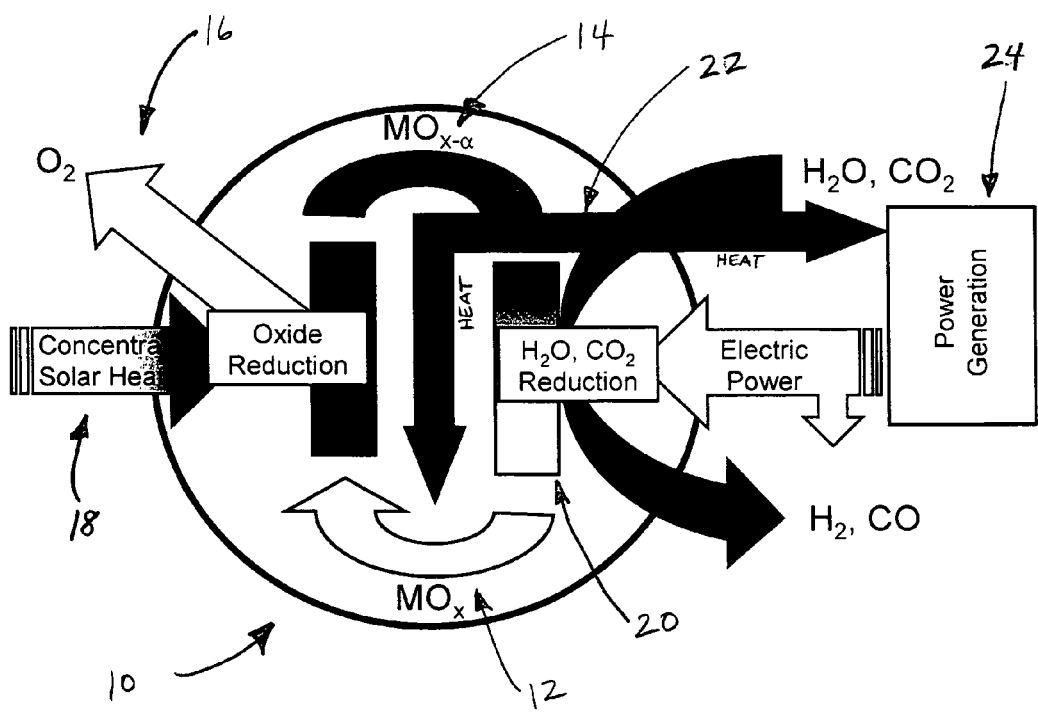
FIG. 1 illustrates a schematic view of a hybrid metal oxide cycle.

Hybrid thermochemical water splitting cycles are proposed in which thermally reduced metal oxides particles are used to displace some but not all of the electrical requirements in a water splitting electrolytic cell. In these hybrid cycles, the thermal reduction temperature is significantly reduced compared to two-step metal-oxide thermochemical cycles in which only thermal energy is required to produce hydrogen from water. Also, unlike the conventional higher temperature cycles where the reduction step must be carried out under reduced oxygen pressure, the reduction step in the proposed hybrid cycles can be (but are not required to be) carried out in air, allowing for thermal input by a solar power tower with a windowless, cavity receiver. These proposed hybrid cycles could also potentially enable the use of heat from a nuclear reactor. Regardless of the energy input source, solar or nuclear, in the hybrid scheme the products from thermal reduction are utilized as a chemically active anode material in a water splitting electrolyzer. Because the anode is re-oxidized during electrolysis, the electrical input required to split water is reduced substantially below the electric input required to drive a conventional water splitting electrolyzer. For example, the ideal decomposition voltage can drop from the 1.23 volts needed in a conventional cell to values as low as 0.23 volts. This approach appears well suited to an electrolyzer where the anode is a packed or moving (possibly fluidized) bed of particles. The bed could either be stand-alone, or could be a mixture of a conductor, e.g. Ni metal, and the solar reduced oxide. This cell design concept could be integrated with a reactive-particle solid particle receiver. Appropriate sizing of the receiver relative to the electrolyzer would allow for round-the-clock continuous operation of the electrolyzer.

Thermochemical cycles are an attractive alternative to electrolysis as they have the potential for higher energy efficiency due to the fact that they avoid the need to first convert thermal energy into electrical energy. There are many proposed metal oxide thermochemical cycles for water splitting. For example, the Iron Oxide cycle is one that has been interesting to the research community because the reduced iron oxide is capable of reacting with water to produce hydrogen. However, in this cycle very high temperatures are needed to thermally reduce magnetite, $Fe_3O_4$, to the reduced oxide, wustite, FeO. Complicating matters is the fact that the recovery of FeO is dependent on the reduction step being conducted under reduced oxygen partial pressure, e.g. in a vacuum or in the presence of an inert sweep gas. Also, the oxides melt and are somewhat volatile at the required temperatures. The thermodynamic high temperature requirements and thermodynamic and kinetic requirements forcing the reaction to take place under an inert atmosphere as well as numerous materials challenges posed for these types of cycles compromise significantly the potential of engineering these cycles into an efficient and industrially economically realizable process. We are, therefore, interested in processes where the thermal reduction step can be done at temperatures below 1500° C. and even in air.

As an example, oxygen can be driven off from cobalt and manganese oxides (i.e. $Co_3O_4$ $Mn_2O_2$, and $Mn_2O_3$) at significantly lower temperatures than needed to thermally reduce magnetite. In addition, oxygen can also be produced from hematite, $Fe_2O_3$, at much lower temperatures.

$$3Fe_2O_3 \rightarrow 2Fe_3O_4 + \tfrac{1}{2}O_2 \tag{1}$$

The factor previously eliminating the use of these attractive thermal reduction chemistries has been the other half of the two-step cycle. The Gibbs free energy, ΔG, of the oxidation $Fe_3O_4$ and the thermally reduced states of cobalt and manganese oxides with water are positive at any temperature above and including room temperature. That is, they are thermodynamically stable in the presence of water and steam, and will not spontaneously oxidize to yield hydrogen. (Note: Because the reaction with water is not favorable, steam is essentially inert in the system and could be employed gainfully as a sweep to promote the reduction reaction if desired).

The factor previously eliminating the use of these attractive thermal reduction chemistries has been the other half of the two-step cycle. The Gibbs free energy, ΔG, of the oxidation $Fe_3O_4$ and the thermally reduced states of cobalt and manganese oxides with water are positive at any temperature above and including room temperature. That is, they are thermodynamically stable in the presence of water and steam, and will not spontaneously oxidize to yield hydrogen. (Note: Because the reaction with water is not favorable, steam is essentially inert in the system and could be employed gainfully as a sweep to promote the reduction reaction if desired).

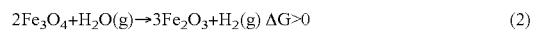

$$2Fe_3O_4 + H_2O(g) \rightarrow 3Fe_2O_3 + H_2(g) \; \Delta G>0 \tag{2}$$

Employing a third reaction with sodium hydroxide or potassium hydroxide has been proposed to make the oxidation thermodynamics favorable for metal oxide cycles in which the oxidation reaction is not favorable However, the addition of the third reaction step and the addition of hydroxides significantly complicate the cycles. A key insight is that these oxidation reactions can be made favorable and the complications of a third step eliminated with the addition of only a small applied voltage at ambient temperature, one significantly less than that required for conventional electrolysis.

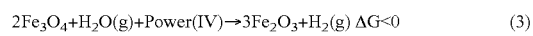

$$2Fe_3O_4 + H_2O(g) + Power(IV) \rightarrow 3Fe_2O_3 + H_2(g) \; \Delta G<0 \tag{3}$$

Comparison to Alternate Approaches:

The proposed hybrid cycle 10, shown schematically in FIG. 1, is similar to conventional two-step thermochemical cycles with the exception that the oxidation step is electrochemically assisted. In the hybrid thermochemical cycle 10, a metal oxide 12 is thermally reduced (driving off oxygen 16) with concentrated solar energy 18. The oxygen deficient metal oxide 14 is subsequently reoxidized in an electrochemical cell 20 to reduce water to hydrogen or carbon dioxide to carbon monoxide. Heat 20 extracted from the reduced metal oxide 14 can be used for power generation 22. The chemical potential for the water or carbon dioxide reducing reactions is provided by the reduced metal oxide and electrical energy. The electrical energy is required is significantly lower than needed for water or carbon dioxide electrolysis alone. The payoff for this hybrid approach is that the extreme challenges posed by the ultra-high temperature reduction (e.g. materials degradation, volatilization, limited heat source options, thermal energy management, closed systems with inert gas sweeps, etc.) are exchanged for a simpler electrochemical step. Because the hybrid cycle 10 is significantly more straight forward, it should be much easier to implement and thus in practice should be more efficient than the proposed processes that split water with an exothermic reaction like that corresponding the iron oxide cycle.

Note that in the hybrid approach, the reduction and oxidation steps of two step metal oxide cycles are separated and can be performed independently of each other. An advantage of this is that while the solar driven thermochemical step can be carried out when the sun is available, the electrochemically driven oxidation step can occur when convenient. Therefore, by over-sizing the thermally driven reduction process relative to the electrochemical oxidation process, it is possible to achieve round-the-clock operation. This has the benefit of maximizing the utilization of the electrochemical equipment and minimizing issues associated with starting and stopping the electrochemical reactor.

It may be noted that this metal-oxide hybrid approach is analogous to the Hybrid Sulfur cycle where the hydrogen production step is electrochemical vs. the 3-step Sulfur-Iodine thermochemical cycle. However, the metal oxide approach utilizes no corrosive or hazardous chemicals and utilizes only gas-solid and gas-liquid reactions, making for convenient separations of valuable products from the working materials. It is also worth pointing out that the hybrid process is an alternative to solar thermal electrolysis processes that have been explored over the past thirty years. They were motivated by the fact that the higher the operating temperature of an electrolytic cell the more one could substitute sunlight for valuable electric work. Thus a number of studies show running modestly high solar processes where sunlight and electric energy is simultaneously supplied to the solar reactor. Our hybrid metal oxide cycle 10 is thermodynamically equivalent to this approach, but by separating the electrolytic step from the thermal reduction step, one greatly reduces the complexity of the solar reactor and allows for a quasi-24-hour continuous solar process. The thermodynamics of metal oxide cycles allow for a much higher percentage of thermal vs. electrical contribution to water splitting at lower temperatures, compared to direct high-temperature water electrolysis.

Materials and Thermodynamics:

A non-exclusive list of metal oxides we believe are of interest for this hybrid approach includes $Fe_2O_3$, $MnO_2$, $Mn_2O_3$, and $Co_3O_4$ where the products from the solar reduction step are $Fe_3O_4$, $MnO$, and $CoO$. By selecting the metal oxides, or perhaps mixed metal oxides, it may be possible to tailor the thermodynamics to a particular temperature range, perhaps enabling application to nuclear power sources or solar power towers. Thus mixed metal oxides, e.g. ferrites of cobalt, nickel, manganese, etc. and similar materials are also of interest as are other families of materials metals with numerous possible valence states such as vanadium, molybdenum, niobium, chrome, tungsten, and cerium-oxides.

Tables 1 and 2 show the thermodynamics of water splitting with a hybrid iron oxide (hematite) cycle. Table 1a showing the reduction of magnetite is provided as a baseline comparison. Clearly, the thermal reduction of hematite is far easier to accomplish. Table 2 shows that only about 10.6 kcal would be needed in a hematite/magnetite hybrid cell where the anode is chemically active whereas about 56.7 kcal of electrical energy is needed to electrochemically split water at room temperature with the traditional inert anode used in electrolyzers; the minimum voltage is reduced to about 0.23 Volts from 1.23 Volts. Tables 3 and 4 show similar calculations with cobalt oxide and Tables 5 and 6 show calculations for one particular manganese oxide couple. For cobalt, the thermal reduction temperature is significantly reduced while the cell voltage is 0.38 Volts, which is still significantly less than needed to electrolyze water directly. For the manganese oxide couple the cell voltage is also about 0.38 volts.

TABLE 1

Thermodynamics of hematite reduction $3Fe_2O_3 = 2Fe_3O_4 + \frac{1}{2}O_2(g)$

| T, °C. | deltaH, kcal | deltaS, cal/K | deltaG, kcal |
|---|---|---|---|
| 0.000 | 55.509 | 31.723 | 46.844 |
| 100.000 | 55.676 | 32.213 | 43.656 |
| 200.000 | 55.864 | 32.666 | 40.408 |
| 300.000 | 55.976 | 32.879 | 37.131 |
| 400.000 | 56.365 | 33.495 | 33.818 |
| 500.000 | 57.543 | 35.109 | 30.398 |
| 600.000 | 59.194 | 37.144 | 26.761 |
| 700.000 | 57.776 | 35.614 | 23.118 |
| 800.000 | 57.708 | 35.545 | 19.562 |
| 900.000 | 57.565 | 35.420 | 16.012 |
| 1000.000 | 57.220 | 35.139 | 12.483 |
| 1100.000 | 56.769 | 34.798 | 8.986 |
| 1200.000 | 56.286 | 34.459 | 5.524 |
| 1300.000 | 55.833 | 34.161 | 2.093 |
| 1400.000 | 55.459 | 33.930 | −1.311 |

TABLE 1a

Thermodynamics of magnetite reduction $Fe_3O_4 = 3FeO + \frac{1}{2}O_2(g)$

| T, °C. | deltaH, kcal | deltaS, cal/K | deltaG, kcal |
|---|---|---|---|
| 0.000 | 75.541 | 30.449 | 67.224 |
| 200.000 | 75.483 | 30.508 | 61.048 |
| 400.000 | 74.380 | 28.626 | 55.110 |
| 600.000 | 71.304 | 24.670 | 49.763 |
| 800.000 | 70.484 | 23.800 | 44.943 |
| 1000.000 | 70.619 | 23.908 | 40.181 |
| 1200.000 | 71.130 | 24.279 | 35.363 |
| 1400.000 | 88.982 | 35.116 | 30.228 |
| 1600.000 | 56.815 | 17.941 | 23.208 |
| 1800.000 | 57.297 | 18.186 | 19.595 |
| 2000.000 | 57.789 | 18.412 | 15.935 |

TABLE 2

Thermodynamics of water dissociation with magnetite
$2Fe_3O_4 + H_2O = 3Fe_2O_3 + H_2(g)$

| T, °C | deltaH, kcal | deltaS, cal/K | deltaG, kcal |
|---|---|---|---|
| 0.000 | 14.431 | 13.226 | 10.818 |
| 100.000 | 12.068 | 5.108 | 10.161 |
| 200.000 | 11.064 | 2.722 | 9.775 |
| 300.000 | 9.895 | 0.496 | 9.611 |
| 400.000 | 7.844 | −2.786 | 9.719 |
| 500.000 | 4.961 | −6.762 | 10.189 |
| 600.000 | 1.621 | −10.851 | 11.096 |
| 700.000 | 1.367 | −11.134 | 12.202 |
| 800.000 | −0.223 | −12.687 | 13.393 |
| 900.000 | −1.723 | −14.026 | 14.732 |
| 1000.000 | −3.008 | −15.078 | 16.189 |

TABLE 3

Thermodynamics of cobalt oxide reduction $Co_3O_4 = 3CoO + \frac{1}{2}O_2(g)$

| T, °C | deltaH, kcal | deltaS, cal/K | deltaG, kcal |
|---|---|---|---|
| 0.000 | 46.532 | 33.919 | 37.267 |
| 100.000 | 47.737 | 37.726 | 33.659 |
| 200.000 | 48.516 | 39.590 | 29.784 |
| 300.000 | 49.020 | 40.564 | 25.770 |
| 400.000 | 49.299 | 41.017 | 21.688 |
| 500.000 | 49.365 | 41.112 | 17.579 |
| 600.000 | 49.214 | 40.932 | 13.475 |
| 700.000 | 48.837 | 40.525 | 9.400 |
| 800.000 | 48.218 | 39.922 | 5.376 |
| 900.000 | 47.343 | 39.143 | 1.422 |
| 1000.000 | 46.193 | 38.204 | −2.447 |
| 1100.000 | 44.750 | 37.115 | −6.214 |
| 1200.000 | 42.997 | 35.884 | −9.865 |
| 1300.000 | 40.914 | 34.517 | −13.387 |
| 1400.000 | 38.483 | 33.020 | −16.765 |

TABLE 4

Thermodynamics of water dissociation with
$3CoO + H_2O(g) = Co_3O_4 + H_2(g)$

| T, °C | deltaH, kcal | deltaS, cal/K | deltaG, kcal |
|---|---|---|---|
| 0.000 | 11.208 | −23.507 | 17.629 |
| 100.000 | 10.238 | −26.580 | 20.156 |
| 200.000 | 9.684 | −27.908 | 22.889 |
| 300.000 | 9.396 | −28.469 | 25.712 |
| 400.000 | 9.323 | −28.590 | 28.568 |
| 500.000 | 9.453 | −28.413 | 31.421 |
| 600.000 | 9.786 | −28.010 | 34.243 |
| 700.000 | 10.332 | −27.420 | 37.016 |
| 800.000 | 11.103 | −26.668 | 39.722 |
| 900.000 | 12.114 | −25.769 | 42.345 |
| 1000.000 | 13.382 | −24.734 | 44.871 |

TABLE 5

Thermodynamics of manganese oxide reduction
$2Mn_2O_3 = 4MnO + O_2(g)$

| T, °C | deltaH, kcal | deltaS, cal/K | deltaG, kcal |
|---|---|---|---|
| 0.000 | 44.529 | 26.551 | 37.277 |
| 100.000 | 44.597 | 26.773 | 34.607 |
| 200.000 | 44.571 | 26.713 | 31.931 |
| 300.000 | 44.493 | 26.566 | 29.267 |
| 400.000 | 44.379 | 26.382 | 26.619 |
| 500.000 | 44.231 | 26.178 | 23.991 |
| 600.000 | 44.049 | 25.957 | 21.384 |
| 700.000 | 43.829 | 25.720 | 18.800 |
| 800.000 | 43.570 | 25.466 | 16.241 |
| 900.000 | 43.266 | 25.195 | 13.708 |
| 1000.000 | 42.913 | 24.907 | 11.203 |
| 1100.000 | 42.509 | 24.602 | 8.727 |
| 1200.000 | 42.048 | 24.278 | 6.283 |
| 1300.000 | 41.527 | 23.936 | 3.872 |
| 1400.000 | 40.942 | 23.576 | 1.496 |
| 1500.000 | 40.289 | 23.197 | −0.843 |

TABLE 6

Thermodynamics of water dissociation with
$2MnO + H_2O(g) = Mn_2O_3 + H_2(g)$

| T, °C | deltaH, kcal | deltaS, cal/K | deltaG, kcal |
|---|---|---|---|
| 0.000 | 13.210 | −16.139 | 17.618 |
| 100.000 | 13.378 | −15.626 | 19.208 |
| 200.000 | 13.629 | −15.031 | 20.741 |
| 300.000 | 13.922 | −14.470 | 22.216 |
| 400.000 | 14.243 | −13.955 | 23.637 |
| 500.000 | 14.587 | −13.479 | 25.008 |
| 600.000 | 14.952 | −13.036 | 26.334 |
| 700.000 | 15.339 | −12.615 | 27.616 |
| 800.000 | 15.752 | −12.212 | 28.857 |
| 900.000 | 16.191 | −11.821 | 30.059 |
| 1000.000 | 16.661 | −11.437 | 31.222 |

Figure 2:
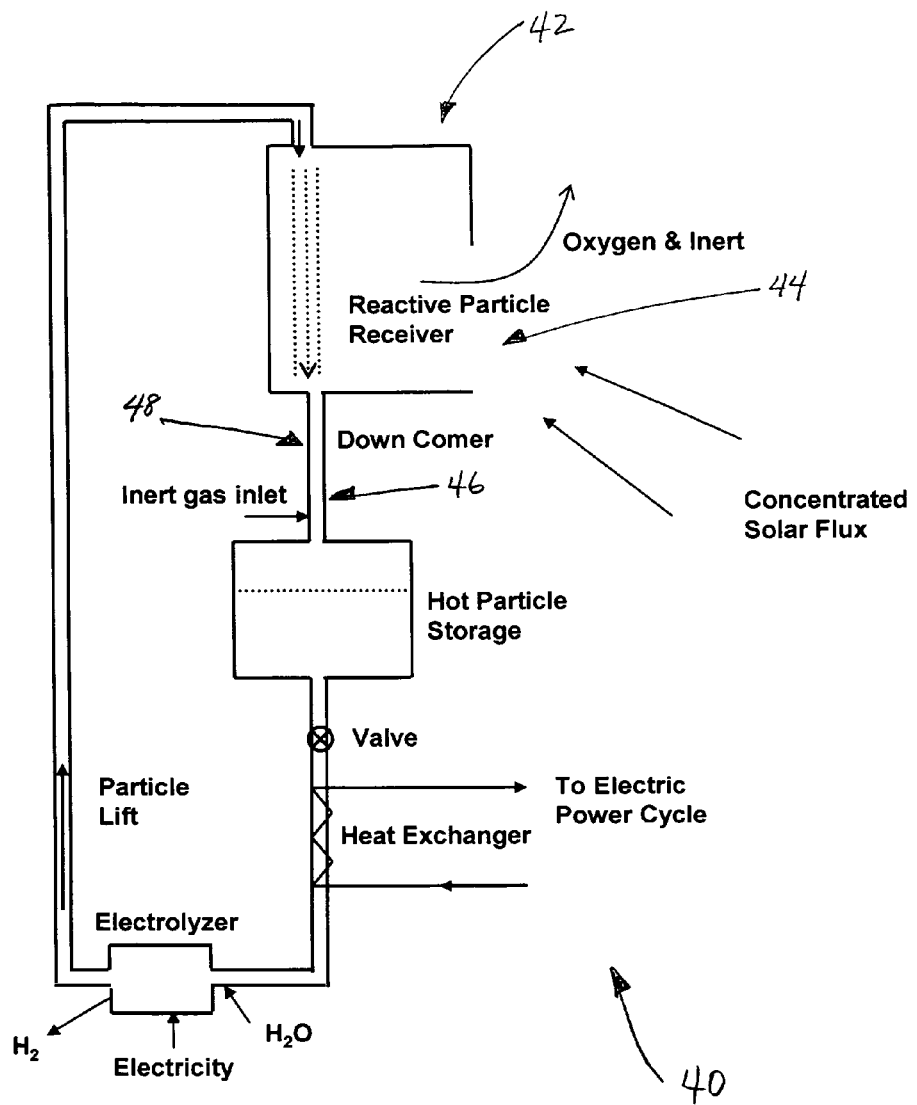
FIG. 2 shows one implementation strategy of the hybrid metal oxide cycle of FIG. 1.

Example Implementation Strategy:

An example implementation strategy 40 is shown in FIG. 2. The oxygen producing step in the hybrid metal oxide cycle is thermally driven. A preferred method could be in a reactive particle receiver 42. In the reactive particle solar receiver 42, the oxidized particles would be directly heated and thermally reduced in an open cavity 44, potentially in air. The reactive particle solar receiver 42 is similar to the solid particle receiver except that the particles undergo thermal reduction chemical reactions in the receiver. The particles could be re-circulated within the receiver to increase residence and heat transfer times. The use of inert gas such a nitrogen (it would not require high purity) inside the reactive particle receiver/reactor cavity 46 could further drive the reaction and/or lower the temperatures required. Countercurrent flow of the metal oxide particles and inert gas in the down comer 48 of the reactive particle receiver 42 would be advantageous for driving the thermal reduction reaction with some of the sensible heat in the particles. The hot (reduced) metal oxides could be used to preheat the metal oxide feed. As shown in FIG. 2, an alternative would be to use the sensible thermal energy to drive electricity producing Rankine or other thermodynamic cycle before being fed to the electrochemical cell. Low-grade steam exiting the Rankine cycle could also be employed as an inert sweep in the reactive solid particle receiver.

We envision that the reduced particles would be fed into the electrolyzer as a slurry in water. The slurry may also contain an electrolyte such as potassium hydroxide. This electrochemical step may be facilitated by packed bed or fluidized bed electrodes, an approach that has received a significant amount of research. In this concept the reduced metal oxide, mixed or doped with a kinetically oxygen-inert electrically conductive material, such as Ni, would be the cell's anode. The metal oxide is the active anode and the Ni is facilitating the needed electron transfer for the anodic reaction to take place, but is not chemically participating in the reaction. The required electrochemical potential needed to split water is reduced in comparison to the required potential of a traditional electrolysis of water by the chemical potential from the metal oxide. The active anode, however, is consumed as it is oxidized during the electrolysis process and would be circulated through the electrolytic cell. After leaving the electrolytic cell the reoxidized metal oxide particles would be rinsed to remove the electrolyte and dried before returning to the reactive particle receiver.

Other Embodiments

Other analogous redox reactions are candidates for a similar approach. For example, the splitting of $CO_2$ to CO and $O_2$ should be amenable to same approach and materials outlined here.

The hybrid electrochemical approach could also be used to enhance the oxidation kinetics of systems wherein the reactions are thermodynamically favorable, but are reaction rate limited.

It is contemplated that the parts and features of any one of the specific embodiments described can be interchanged with the parts and features of any other of the embodiments without departing from the spirit and scope of the present disclosure. The foregoing description discloses and describes merely exemplary embodiments of the present disclosure and is not intended to be exhaustive or to limit the disclosure to the precise form disclosed. As will be understood by those skilled in the art, the disclosure may be embodied in other specific forms, or modified or varied in light of the above teachings, without departing from the spirit, novelty or essential characteristics of the present disclosure. Accordingly, the disclosed embodiments are intended to be illustrative, but not limiting, of the scope of the invention. The exclusive right to all modifications within the scope of this disclosure is reserved.

What is claimed is:

1. A hybrid thermochemical water splitting cycle comprising the steps of:
    thermally reducing a metal oxide with concentrated solar energy to produce an oxygen-deficient metal oxide;
    feeding the oxygen-deficient metal oxide to an electrochemical cell; and
    reoxidizing the oxygen-deficient metal oxide in the electrochemical cell;
    wherein the chemical potential for the reactors is provided by the metal oxide and electrical energy; and
    wherein the electrical energy required is significantly lower than needed for water or carbon dioxide electrolysis alone.

2. The hybrid thermochemical water splitting cycle of claim 1, wherein heat extracted from the reduced metal oxide is used for power generation.

3. The hybrid thermochemical water splitting cycle of claim 2, wherein the step of reoxidizing an oxygen-deficient metal oxide in an electrochemical cell reduces water to hydrogen.

4. The hybrid thermochemical water splitting cycle of claim 3, wherein the step of reoxidizing an oxygen-deficient metal oxide in an electrochemical cell reduces carbon dioxide to carbon monoxide.

5. The hybrid thermochemical water splitting cycle of claim 4, wherein the thermal reduction step is carried out in air.

6. The hybrid thermochemical water splitting cycle of claim 5, wherein the electrical energy required is as low as 0.23 volts.

* * * * *